US010969053B2

(12) United States Patent
Crane et al.

(10) Patent No.: US 10,969,053 B2
(45) Date of Patent: Apr. 6, 2021

(54) LEAD PIPE SPUDDING PRIOR TO EXTRACTION OR REMEDIATION

(71) Applicant: Earth Tool Company LLC, Lake Mills, WI (US)

(72) Inventors: Robert F. Crane, Nekoosa, WI (US); Steven W. Wentworth, Scottsdale, AZ (US); Mark D. Randa, Oconomowoc, WI (US)

(73) Assignee: The Charles Machine Works, Inc., Perry, OK (US)

(*) Notice: Subject to any disclaimer, the term of this patent is extended or adjusted under 35 U.S.C. 154(b) by 112 days.

(21) Appl. No.: 16/126,380

(22) Filed: Sep. 10, 2018

(65) Prior Publication Data

US 2019/0078720 A1 Mar. 14, 2019

Related U.S. Application Data

(60) Provisional application No. 62/555,880, filed on Sep. 8, 2017.

(51) Int. Cl.
*F16L 55/165* (2006.01)
*F16L 55/18* (2006.01)
*F16L 1/028* (2006.01)
*E21B 29/10* (2006.01)
*F16L 1/06* (2006.01)

(52) U.S. Cl.
CPC ........ *F16L 55/1657* (2013.01); *E21B 29/10* (2013.01); *F16L 1/028* (2013.01); *F16L 1/06* (2013.01); *F16L 55/165* (2013.01); *F16L 55/18* (2013.01)

(58) Field of Classification Search
CPC ........ E21B 29/08; E21B 29/10; F16L 55/165; F16L 55/1657; F16L 55/18; F16L 1/028; F16L 1/06
USPC ................ 405/184.1; 166/55, 207, 208, 217
See application file for complete search history.

(56) References Cited

U.S. PATENT DOCUMENTS

| 2,787,492 | A | * | 4/1957 | Gisser | B25B 13/5083 294/96 |
| 3,785,193 | A | * | 1/1974 | Kinley | E21B 29/10 72/393 |
| 4,457,647 | A | * | 7/1984 | Dusette | F16L 55/28 138/97 |
| 4,487,052 | A | * | 12/1984 | Yarnell | E03F 9/002 72/393 |
| 4,657,436 | A | * | 4/1987 | Yarnell | E03F 3/06 138/97 |
| 4,789,268 | A | * | 12/1988 | Yarnell | E03F 3/06 166/361 |

(Continued)

*Primary Examiner* — William M McCalister
(74) *Attorney, Agent, or Firm* — Tomlinson McKinstry, P.C.

(57) ABSTRACT

A method for enlarging a crushed section of a ductile pipe. A wire rope having a bead or plurality of beads attached to the rope is placed in a ductile pipe. When a series of beads is used, each of the beads is sequentially larger. The wire rope is pulled through the crushed section, and the ductile pipe conforms to the larger diameter of the beads. The crushed section of pipe may be expanded so that a larger wire rope suitable for pipe extraction may be passed through. Alternatively, the pipe may be reformed and expanded to near or greater than its original size. The pipe may then be coated or a smaller slip-lined pipe may be placed within the original pipe.

14 Claims, 5 Drawing Sheets

(56) References Cited

U.S. PATENT DOCUMENTS

| | | | | |
|---|---|---|---|---|
| 5,013,188 | A * | 5/1991 | Campbell | E21B 7/30 405/184 |
| 5,076,730 | A * | 12/1991 | Bergey | E03F 3/06 138/97 |
| 5,076,731 | A * | 12/1991 | Luksch | E03F 3/06 405/184.3 |
| 5,263,515 | A * | 11/1993 | Goodale | F16L 55/163 138/89 |
| 5,348,095 | A * | 9/1994 | Worrall | E21B 7/20 166/380 |
| 5,924,489 | A * | 7/1999 | Hatcher | E21B 29/02 166/298 |
| 5,984,582 | A | 11/1999 | Schwert | |
| 6,655,874 | B2 * | 12/2003 | Crane | F16L 55/1658 175/22 |
| 6,702,520 | B2 * | 3/2004 | Paletta | E03F 5/022 405/184.1 |
| 6,799,923 | B2 | 10/2004 | Carter et al. | |
| 7,128,146 | B2 * | 10/2006 | Baugh | E21B 43/105 166/206 |
| 7,128,499 | B2 * | 10/2006 | Wentworth | F16L 1/028 405/184.1 |
| 7,137,757 | B1 * | 11/2006 | Cosban | A46B 3/18 405/184.2 |
| 7,308,755 | B2 * | 12/2007 | Cook | E21B 43/103 166/207 |
| 7,360,604 | B2 * | 4/2008 | Lohbeck | E21B 43/105 166/384 |
| 7,363,691 | B2 * | 4/2008 | Cook | E21B 17/08 166/207 |
| 7,497,000 | B1 * | 3/2009 | Eslambolchi | E21B 29/10 138/97 |
| 7,533,731 | B2 * | 5/2009 | Corre | E21B 29/10 166/187 |
| 7,597,140 | B2 * | 10/2009 | Filippov | E21B 43/105 166/207 |
| 8,277,177 | B2 | 10/2012 | Liang | |
| 9,085,967 | B2 * | 7/2015 | Bennett | E21B 43/105 |
| 9,103,483 | B2 * | 8/2015 | Tjader | F16L 55/1658 |
| 9,366,117 | B2 * | 6/2016 | Van Riet | E21B 43/105 |
| 9,476,536 | B2 | 10/2016 | Tjader | |
| 2004/0140086 | A1 * | 7/2004 | Tran | E21B 43/105 166/55 |
| 2005/0115719 | A1 * | 6/2005 | Abercrombie Simpson | E21B 43/105 166/383 |
| 2006/0076147 | A1 * | 4/2006 | Ring | B21C 37/16 166/380 |
| 2006/0243444 | A1 * | 11/2006 | Brisco | E21B 21/10 166/298 |
| 2007/0048091 | A1 * | 3/2007 | Tjader | F16L 55/1658 405/184.3 |
| 2007/0154270 | A1 * | 7/2007 | Waddell | F16L 55/1608 405/184.1 |
| 2008/0083058 | A1 * | 4/2008 | Heffner | E03D 9/00 4/255.01 |
| 2008/0223568 | A1 * | 9/2008 | Roggeband | B21D 39/20 166/55 |
| 2018/0195641 | A1 | 7/2018 | Olander | |

\* cited by examiner

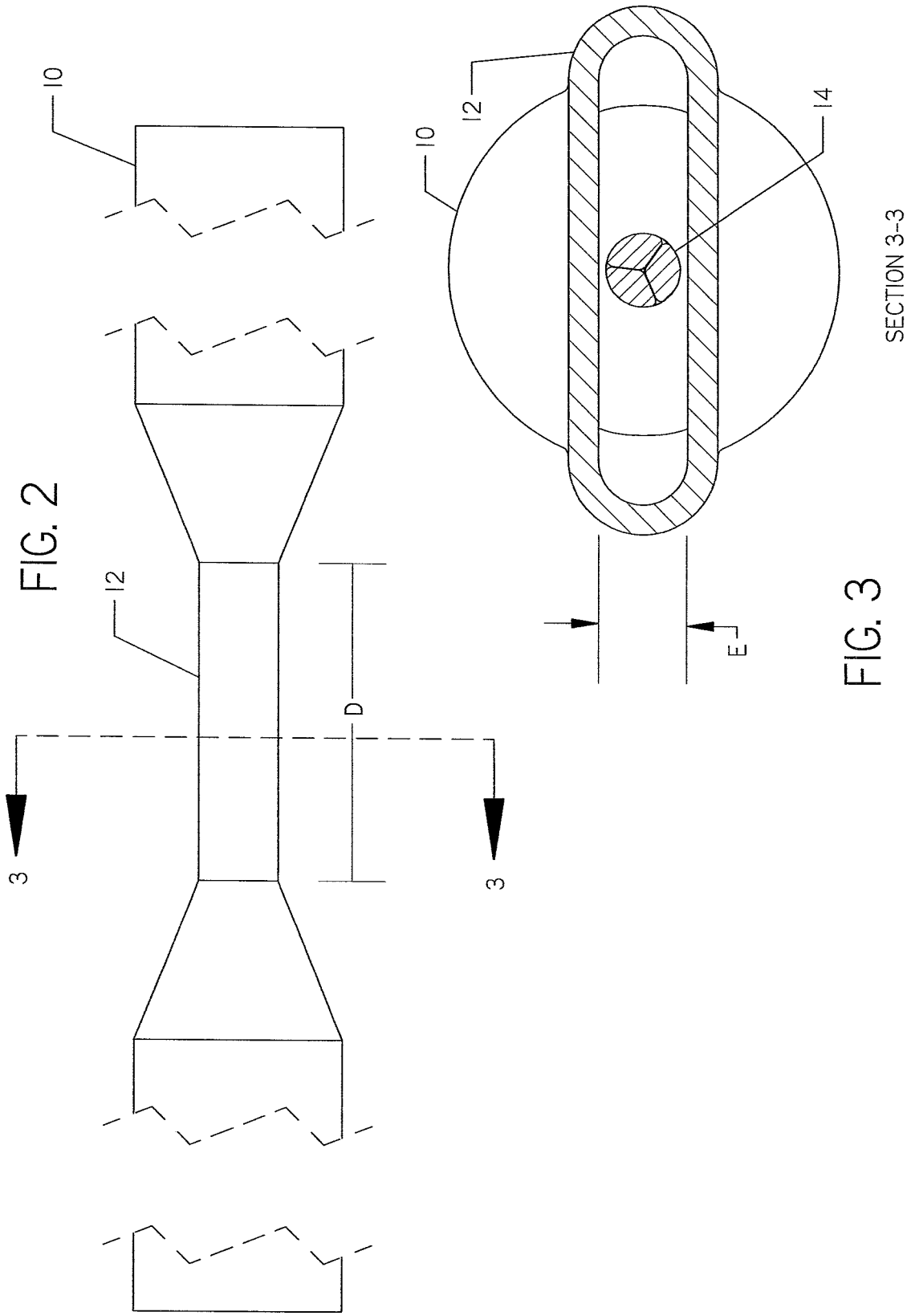

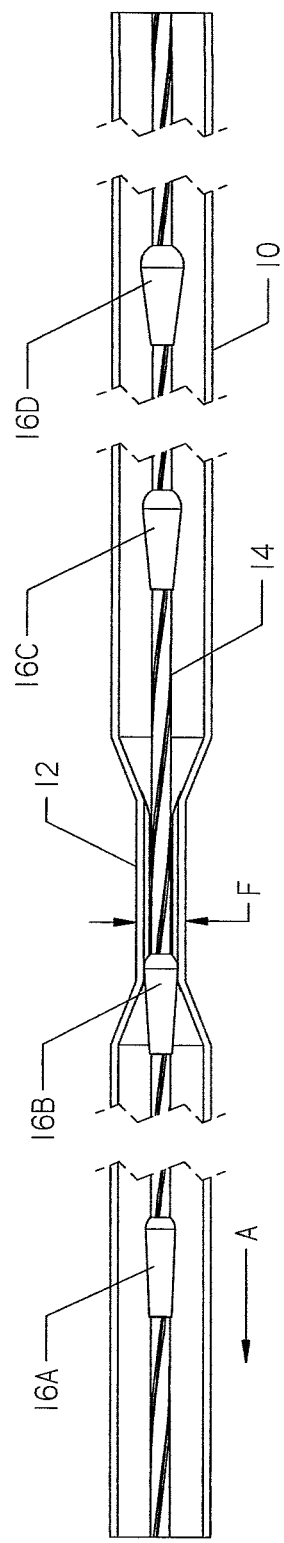

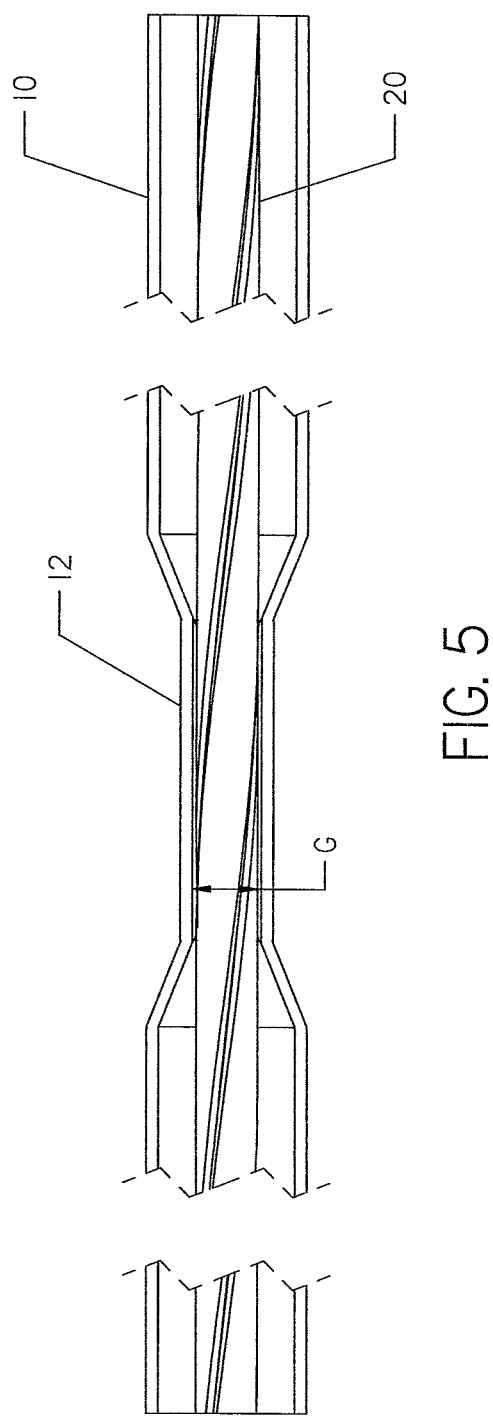

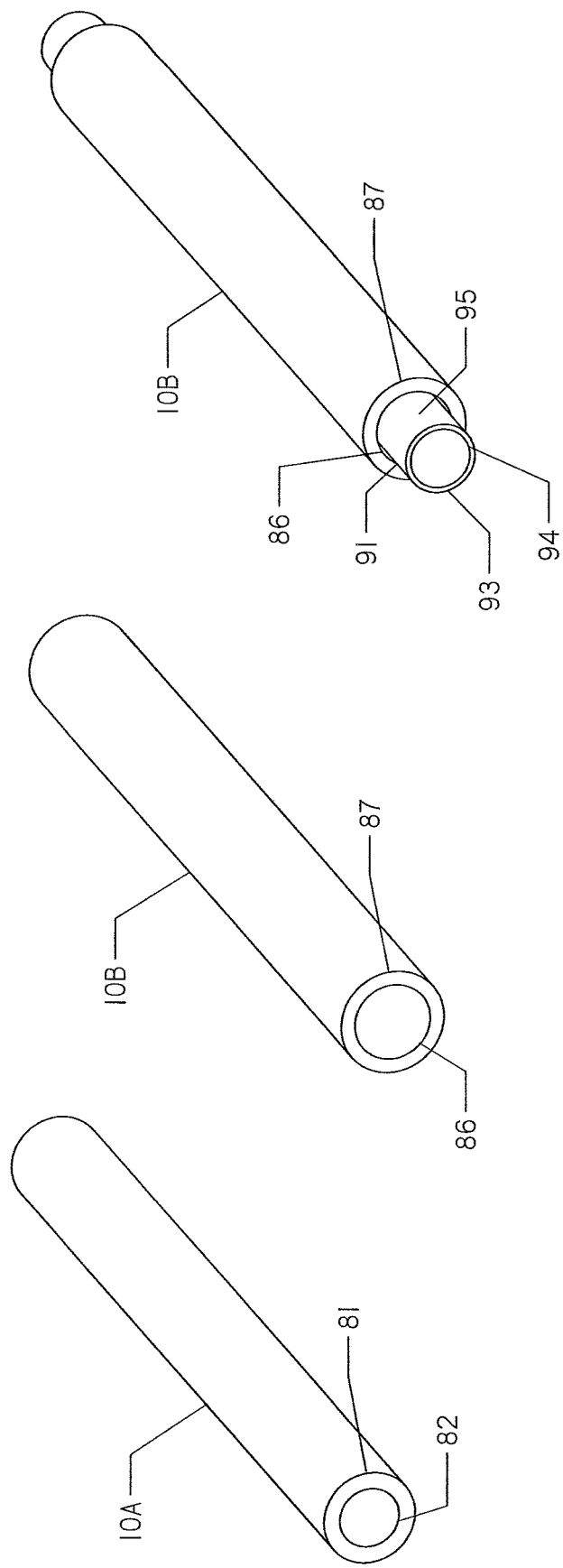

US 10,969,053 B2

LEAD PIPE SPUDDING PRIOR TO EXTRACTION OR REMEDIATION

FIELD

The present invention relates generally to expansion of ductile pipes.

BRIEF DESCRIPTION OF THE DRAWINGS

FIG. 2 is a side view of a section of pipe.

FIG. 3 is an end view along cross-section 3-3 showing the pipe with a wire rope disposed within.

FIG. 4 is a cutaway side view showing the wire rope and pipe of FIG. 1. Two beads have been pulled through a crushed section of the pipe.

FIG. 5 is a cutaway side view of the expanded pipe with a larger wire rope within.

FIG. 6 is a perspective view of an unexpanded length of pipe.

FIG. 7 is a perspective view of an expanded length of pipe.

FIG. 8 is a perspective view of the expanded length of pipe of FIG. 7, with a slip-lined pipe disposed within.

SUMMARY

Figure 1:
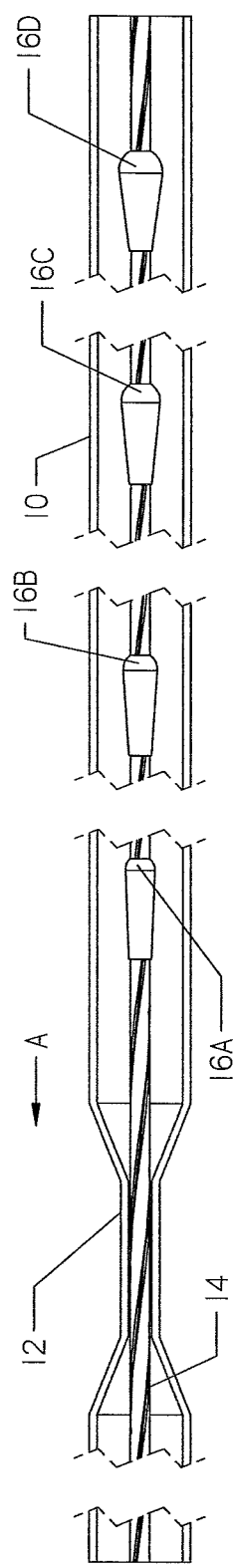
FIG. 1 is a cutaway side view showing a wire rope passing through a section of pipe. Distances between beads attached to the rope are shortened for clarity.

The invention is directed to a method. The method comprises placing a first wire rope having a first diameter and comprising at least one bead into a pipe. The at least one bead is disposed on a first side of a collapsed section of the pipe. The collapsed section has an effective diameter. The method further comprises pulling the wire rope through the collapsed section of pipe such that the at least one bead passes through the collapsed section to upsize the effective diameter of the collapsed section.

The invention is also directed to a system. The system comprises a ductile pipe, a first wire rope, and at least one bead disposed on the first wire rope. The ductile pipe is characterized by an original inner diameter and a crushed section having an effective inner diameter smaller than the original inner diameter. The first wire rope is disposed within the ductile pipe.

DETAILED DESCRIPTION

Ductile pipes, made of materials such as lead, have been used to connect main water supply lines to residential lateral connections. Lateral connections, such as pipe 10 in FIGS. 1-5, connect a potable water supply to a residence. Many such pipes 10 were manufactured from lead, and are proven sources of lead contamination of municipally supplied drinking water. Removal or remediation of lead laterals is desirable for health reasons but has proven difficult as a result of inability to apply sufficient axial force to extract the pipe from the surrounding soil.

Pipe pullers using wire rope have been developed to apply such axial force. One such apparatus is shown in U.S. Pat. No. 7,128,499, issued to Wentworth, the contents of which are incorporated herein by reference. The device in the Wentworth reference uses a wire rope disposed within the pipe to attach to an end cap to provide pulling force at the distal end of a pipe. The rope may also pull a replacement pipe behind the pipe being replaced. Additionally, a pair of jaws crimps the removed pipe and provides pulling force. While this and similar devices minimize excavation required, some practical difficulties remain.

Ductile pipe, such as lead pipe, has properties that invite damage during installation. Such pipe has a low yield strength—in one embodiment, 1200 psi. This material property allows lead pipe to be formed with bends to facilitate follow an excavated trench.

The bends, made without a mandrel for controlling bend cross section, reduce the cross section of the pipe and act as an obstruction to the passage of a wire rope in one or more locations. Additionally, scale may build up within the pipe, restricting the optimal inner diameter B of the pipe 10. Finally, damage may occur during installation, creating an obstructed section of pipe.

Whatever the reason, the pipes 10 often comprise a collapsed section 12 as shown in FIG. 2. The collapsed section 12 has a length D and an effective diameter E, as shown in FIG. 3. The effective diameter E of the crushed section 12 is not large enough to pass a wire rope for conventional pipe pulling processes. However, because the lateral pipe 10 is large enough to pass water, a smaller wire rope 14 may be able to pass through.

In FIGS. 1 and 3, a small wire rope 14 is shown passed through the pipe 10, including collapsed section 12. The small wire rope 14 has a smaller effective diameter than the effective diameter E of the crushed section 12. The small wire rope 14 may in one embodiment have a diameter of ¼" in a 1" lead pipe 10. The small wire rope 14 is preferably attached at its end in the direction A to a spool or other conventional cable puller.

The small wire rope 14 may fail at high tensile force, and thus is not strong enough to pull the pipe 10 from the ground in direction A. However, due to the ductile nature of the pipe 10, the small wire rope 14 is strong enough to pull a bead through the collapsed section 12.

As shown in FIG. 1, at least one bead 16 is attached to the small wire rope. The bead 16 has a conical or spherical shape. In the embodiment of FIG. 1, the beads 16 are conical.

The bead 16 is harder than the ductile pipe 10. The low yield strength of the lead material causes the pipe 10 to conform to the circumference of the bead 16. Thus, the bead 16 pushes the crushed section 12 apart, increasing the effective diameter E of the crushed section.

In one embodiment, a bead 16 may expand the crushed section 12. A second bead 16 with a slightly larger diameter may then be pulled through the crushed section. Progressively larger beads 16 may be used until the crushed section 12 has a desired larger effective diameter.

Alternatively, as shown in FIG. 1, a series of beads 16 may be utilized on the small wire rope 14. As shown, the beads 16 may be sized such that each bead 16 is progressively larger moving away from the wire rope pull direction A. The beads may be spaced a distance apart that is greater than the length D of a typical obstruction. In one embodiment, the beads 16 are spaced apart at least six inches. Only one bead 16 encounters the crushed section 12 at any one time. Thus, each bead 16 performs only a small part of the expansion operation.

By reducing the expansion work at each bead 16, the maximum tensile stress on the small wire rope 14 drawing the beads 16 through the pipe 10 is reduced. Reducing the tensile stress on the small wire rope 14 reduces the likelihood of wire rope tensile failure.

In one embodiment, four beads 16 are used. A first bead 16A has a minimum effective diameter just larger than the effective diameter E of the collapsed section 12. A second bead 16B is larger than the first bead 16A. A third bead 16C is larger still. A fourth bead 16D is larger still. The fourth bead 16D may be followed by one or more additional beads, or may be the final bead. In any case, the final bead will have an effective diameter that is greater than or equal to the desired diameter of the pipe 10 after the expansion process is complete.

The following dimensions are given as an example of one embodiment, and are not intended to be exclusive of dimensions that could be utilized with this invention. In this embodiment a crushed section 12 may allow a 0.250" diameter small wire rope 14 to pass. The first bead 16A is sized at 0.38" max diameter, the second 16B at 0.44", the third 16C at 0.50" and the fourth and final bead 16D at 0.56". The expansion process forces are minimized by the use of progressive upsizing and a longer length of rope 14 between beads than the length D of the crushed section 12.

In FIG. 4, the second bead 16B is shown within the crushed section 12. As the expansion work of beads 16A and 16B is complete, the crushed section 12 has an effective diameter F, larger than the diameter E, but smaller than optimal inner diameter B. In the embodiment where the diameter of the first bead is 0.44", the effective diameter F of crushed section 12 is approximately 0.44" in FIG. 4.

As shown in FIG. 5, after the pipe 10 is upsized, a larger wire rope 20 may be placed through the pipe for conventional extraction. The larger wire rope 20 may be drawn through the pipe behind the final bead 16D and attached to the small wire rope 14. The larger wire rope 20 is of sufficient tensile strength to perform conventional extraction operations. Further, the larger wire rope 20 may pull a product pipe (not shown) in place behind the extracted pipe 10.

The effective diameter of the pipe 10 through the crushed section 12 is G after expansion is complete. Diameter G is greater than the diameter of the larger wire rope 20, and approximately the same dimension as the fourth bead 16D.

After drawing the beads 16 through the pipe 10 and installing the larger wire rope 20, the pipe 10 may be broken loose from surrounding soil. Tensile forces to break the friction associated with long residence time in soil may be, for example, in the 6-10 ton range. After breaking the friction, the large diameter wire rope 20 may be removed and a lower strength, and therefore lower cost tensile strand such as a smaller wire rope or low cost polyester pulling tape, can be used to produce the much lower forces required to complete the pull. Use of such smaller diameter towing strand allows the lead pipe 10 to be cut into sections or folded.

An additional embodiment of the method is to pull the full length of the lateral pipe 10 from the soil with the larger wire rope 20 in its interior. The pipe 10 may then be removed from the rope 20 by ripping it lengthwise with a cutting blade, either static or rotating. This method salvages the wire rope 20 for reuse.

In another embodiment, rather than extracting the pipe 10, the pipe may be lined with a resin. Lining techniques generally require a consistently sized large interior. Because ductile pipe 10 has a low strength, it is possible to increase its size to greater than the original pipe diameter using increasing sizes of bead as discussed.

The resin coats the inside diameter of the pipe 10. In this embodiment, the beads 16 upsize the pipe 10 as discussed. Additional sizes of beads 16 may be utilized to restore the pipe 10 to an effective diameter near, at, or greater than the original diameter B of the pipe 10.

When an entire length of pipe 10, rather than a collapsed section 12 (FIG. 1), is to be expanded, steps may be taken to limit the tensile stress on the wire rope 14. For example, if collapsed sections 12 have been remediated prior to expanding the entire pipe 10 according to the previous method, the larger wire rope 20 may be used with large beads (not shown) to accommodate the increased forces. Additionally, the beads 16 may be spaced apart such that only one bead is expanding the pipe 10 at any one time. If desired, spacing between beads 16 may be greater than or equal to the length of the lateral pipe 10.

For example, as shown in FIGS. 6-8, an unexpanded length of ductile pipe 10A may have an inside diameter 82 and an outside diameter 81. As shown in FIG. 7, the same pipe 10B, after expansion, may have an enlarged inner diameter 86. The inner diameter 86 may conform approximately to the diameter of the largest bead 16 drawn through the pipe 10. The outer diameter 87 will also expand and the wall of pipe 10B will become thinner.

As shown in FIG. 8, expanding the pipe 10B may allow for placement of a slip lined pipe 95 within its inner diameter. The slip lined pipe 95 may be formed of polyethylene, copper, or HDPE. The outer diameter 93 of the slip lined pipe 95 is smaller than the expanded inner diameter 86 of the expanded pipe 10B. Further, the inner diameter 94 of the slip lined pipe 95 may be similar or identical to the original unexpanded inner diameter 86 of the unexpanded pipe 10A (FIG. 6).

Expansion of the pipe 10B will reform deformed areas. It may be advantageous to clean the inner diameter 86 of the pipe 10B with compressed air and to lubricate the slip lined pipe 95 prior to insertion. Further, it may be advantageous to coat the lead pipe 10B with a resin or passivation chemical to minimize the chance that lead from the pipe 10B will pass through the slip lined pipe 95 and into the water supply. Such a passivation may take place prior to installing the slip lined pipe 95. Alternatively the annulus 91 between the pipe 10B and slip lined pipe 95 may be filled with a passivation chemical after installation.

As successive beads 16 expand the inner diameter 86 and outside diameter 87 of pipe 10B, its length may also grow. In one example, when the mean circumference of a 0.75" lead pipe was increased by 14%, the length of the pipe increased by 2.2%. Such lengthwise expansion will provide a gradual break between the outer surface of pipe 10B and surrounding soil.

Therefore, the larger inner diameter 86 not only allows access for the larger wire rope 20, it also at least partially frees the pipe 10B from the soil, decreasing required extraction forces.

The various features and alternative details of construction of the apparatuses described herein for the practice of the present technology will readily occur to the skilled artisan in view of the foregoing discussion, and it is to be understood that even though numerous characteristics and advantages of various embodiments of the present technology have been set forth in the foregoing description, together with details of the structure and function of various embodiments of the technology, this detailed description is illustrative only, and changes may be made in detail, especially in matters of structure and arrangements of parts within the principles of the present technology to the full extent indicated by the broad general meaning of the terms in which the appended claims are expressed.

The invention claimed is:

1. A method comprising:
   placing a first wire rope having a first diameter and comprising a series of beads with increasing diameter into a ductile pipe, wherein the series of beads is disposed on a first side of a collapsed section of the pipe, the collapsed section having an effective diameter; and
   pulling the wire rope through the collapsed section of pipe such that the series of beads enter the collapsed section in order of increasing diameter;
   with more than one of the series of beads, upsizing the effective diameter of the collapsed section.

2. The method of claim 1 further comprising:
   placing a second wire rope having a second diameter into the pipe; and
   extracting the pipe with the second wire rope.

3. The method of claim 2 further comprising pulling a replacement pipe behind the pipe while the pipe is being extracted with the second wire rope.

4. The method of claim 2 wherein the second diameter is larger than the first diameter and the effective diameter of the collapsed section.

5. The method of claim 1 wherein the series of beads define increasing diameters in the order that each of the series of beads is pulled through the collapsed section.

6. The method of claim 1 wherein each of the series of beads is spherical.

7. The method of claim 1 wherein the pipe defines an original outer diameter, and wherein the effective outer diameter of the collapsed section is larger than the original outer diameter after the step of pulling the wire rope through the collapsed section of pipe.

8. The method of claim 7 further comprising pulling a replacement pipe into the pipe.

9. The method of claim 8, in which the replacement pipe has the same outer inner diameter as the original outer inner diameter of the pipe.

10. The method of claim 1 further comprising the step of lining the inside diameter of the pipe after the at least one bead has been pulled through the collapsed section.

11. The method of claim 1 further comprising the step of pulling a second pipe into the pipe after the step of pulling the wire rope through the collapsed section of pipe.

12. The method of claim 11 further comprising coating an inner surface of the pipe prior to the step of pulling the replacement pipe into the pipe.

13. A method, comprising:
    disposing a first wire rope through a ductile pipe section, the first wire rope comprising a plurality of beads, the plurality of beads disposed in a sequence of increasing diameter;
    pulling the wire rope through a collapsed section of ductile pipe, the collapsed section being defined by an initial effective inner diameter;
    with two or more of the plurality of beads, upsizing the initial effective inner diameter of the collapsed section of the ductile pipe to an enlarged effective inner diameter; and
    thereafter, with the first wire rope, pulling a second wire rope through the collapsed section of the ductile pipe, the second wire rope having a larger diameter than the first wire rope.

14. The method of claim 13 in which the second wire rope has a larger diameter than the initial effective inner diameter.

* * * * *

UNITED STATES PATENT AND TRADEMARK OFFICE
CERTIFICATE OF CORRECTION

PATENT NO. : 10,969,053 B2
APPLICATION NO. : 16/126380
DATED : April 6, 2021
INVENTOR(S) : Crane et al.

Page 1 of 1

It is certified that error appears in the above-identified patent and that said Letters Patent is hereby corrected as shown below:

In the Claims

Column 6, Claim 9, Line 2, please delete both occurrences of the word "outer".

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*